Nov. 23, 1965  G. B. FOSTER  3,219,909
TRANSDUCER
Filed April 1, 1963  4 Sheets-Sheet 2

INVENTOR
George B. Foster,
BY Diggins + Le Blanc
ATTORNEYS

Nov. 23, 1965  G. B. FOSTER  3,219,909
TRANSDUCER
Filed April 1, 1963  4 Sheets-Sheet 3

INVENTOR
George B. Foster,
BY Diggins + LeBlanc
ATTORNEYS

Nov. 23, 1965  G. B. FOSTER  3,219,909
TRANSDUCER
Filed April 1, 1963  4 Sheets-Sheet 4

INVENTOR.
George B. Foster
BY
Le Blanc and Shur
ATTORNEYS

United States Patent Office 3,219,909
Patented Nov. 23, 1965

3,219,909
TRANSDUCER
George B. Foster, Worthington, Ohio, assignor, by mesne assignments, to The Reliance Electric and Engineering Company, Cleveland, Ohio, a corporation of Ohio
Filed Apr. 1, 1963, Ser. No. 271,836
15 Claims. (Cl. 321—45)

This application is a continuation-in-part of application No. 46,736, filed August 1, 1960.

This invention relates to transducing devices of the magnetic type known as Hall generators and more particularly relates to a system for controlling the conversion efficiency of such generators.

Hall effect generators provide a Hall voltage (output or signal voltage) across a pair of faces when an exciting current is passed between another pair of faces and a magnetic field is passed through a final pair of faces. The value of the Hall voltage is dependent upon the exciting current, the magnetic field and the temperature of the Hall generator. Since Hall generators are normally used to transduce a magnetic field to a Hall voltage it is usually important that the relationship between a given change in magnetic field and the resultant change in Hall voltage be maintained constant.

In normal usage it is common for the Hall generator to be subjected to varying environments with a resultant effect on any of the numerous variables capable of modifying its characteristics and particularly its conversion efficiency.

It is the purpose of this invention to provide a calibration or standardization system for compensating for this variation in characteristics and producing a fixed and controllable conversion efficiency.

According to the invention a means is provided for continuously (or intermittently, if desired) monitoring or determining the conversion efficiency of the Hall generator and this information is utilized to vary the amount of exciting current to maintain the efficiency at some predetermined nominal value. Deviations in the efficiency of the Hall generator are sensed by subjecting the generator to an alternating magnetic induction created by a standardizing coil which is so disposed in relation to the generator as to cause a variation in the total magnetic induction to which the generator is exposed. The frequency of variation of this incremental magnetic induction is selected to lie outside of the band of frequencies of variation of magnetic induction which the transducer is intended to investigate. Preferably this frequency is higher than that of the useful span of measurement of the indicating instrument because of convenience of circuit design.

The variations in magnetic field applied to the Hall generator by the standardizing coil are of known and fixed amplitude and frequency thereby making it possible to selectively sample the Hall voltage produced by the standardization field. This sampled voltage is then fed to suitable comparator circuitry, where it is compared to a reference or standard, and any difference between the two is utilized to produce an error signal which actuates a mechanism for varying the Hall generator excitation current to re-establish equality between the sampled standardization voltage and the reference. In this manner the conversion efficiency of the unit is established and continuously maintained to a very high degree of accuracy.

It is accordingly a primary object of the present invention to provide a Hall generator transducer system wherein the conversion efficiency of the system is accurately controlled and maintained.

It is another object of the invention to provide a simple and effective means for controlling the conversion efficiency of a Hall generator.

It is another object of the invention to improve the transfer characteristic; that is, the $E_h$ v. H characteristic of a Hall generator.

It is another object of the invention to provide a simple and effective means for controlling the conversion efficiency of a Hall generator by subjecting the generator to a known magnetic induction and monitoring the Hall voltage produced by this induction to control the excitation current of the generator and thereby standardize its conversion efficiency.

It is still another object of the invention to provide an improved Hall generator transducer system which includes a standardization coil associated with the generator and excited by a known alternating current to produce a standardization Hall voltage which is utilized to control the exciting current of the generator to maintain its conversion efficiency at a constant value.

These and further objects and advantages of the invention will become apparent upon reference to the following specification and claims and appended drawings wherein:

Figure 1:
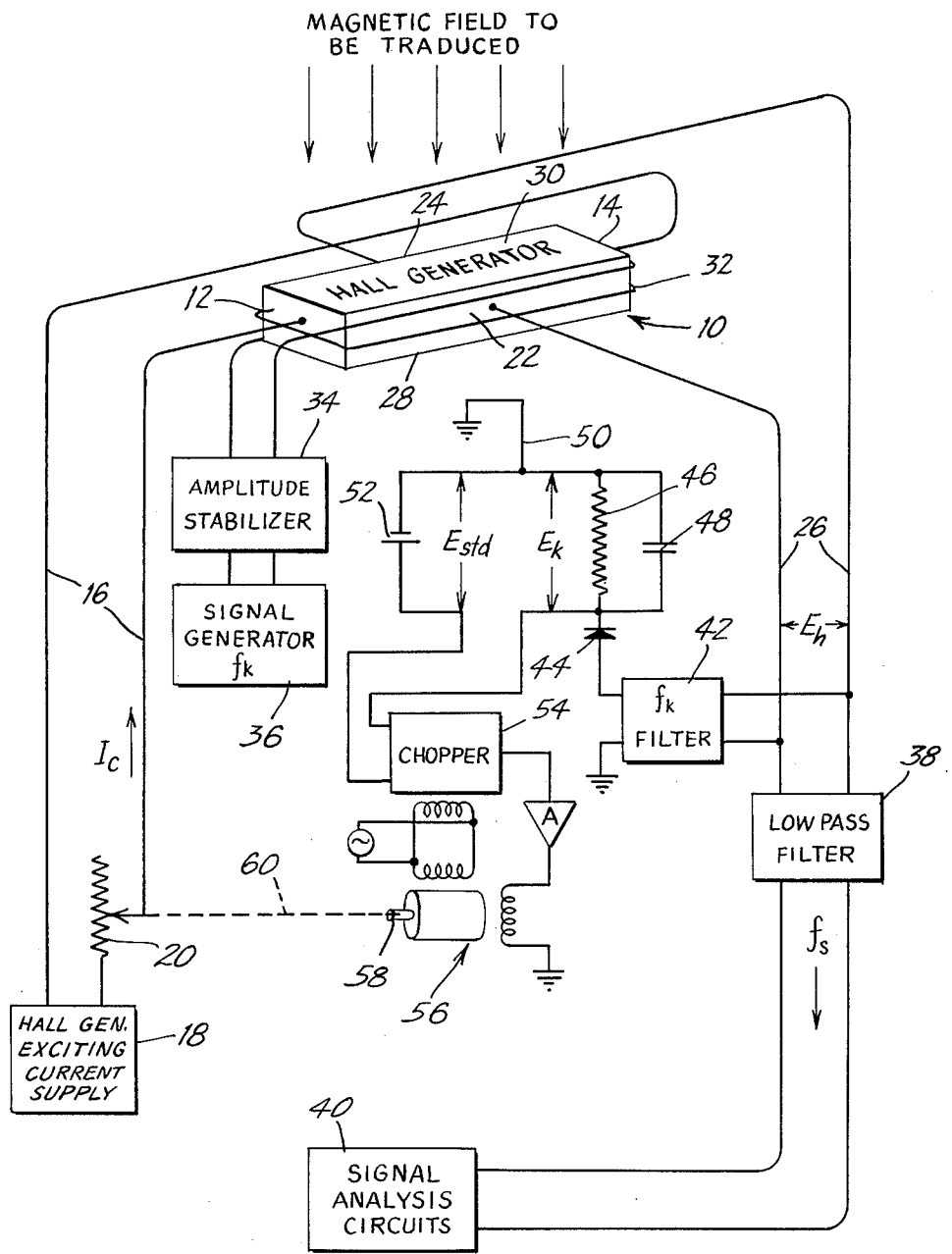
FIGURE 1 is a diagrammatic illustration of a Hall generator transducer constructed according to one embodiment of the invention.

Referring to FIGURE 1 there is shown a Hall generator 10 having a pair of opposed faces 12 and 14 connected to supply lines 16 from a Hall generator exciting current supply 18. The current supply is made variable by variable resistor 20 for a purpose presently to become apparent. The Hall generator 10 has a second pair of opposed faces 22 and 24 to which are connected a pair of Hall voltage leads 26. The final faces 28 and 30 of the Hall generator have no leads connected thereto.

The Hall generator is preferably one formed from semi-conductor materials such as those manufactured by Ohio Semi-conductors, Inc., and described in "Electronic Design," March 4, 1959. The generator provides a Hall voltage $E_h$ across the faces 22 and 24 when an exciting current $I_c$ is passed between the faces 12 and 14 and a magnetic field is applied through the faces 28 and 30.

According to the invention the Hall generator 10 has wrapped around the faces 12, 14, 22 and 24 a coil 32 having its magnetic axis parallel to the magnetic field passing through the faces 28 and 30. It will be apparent that a current through the coil 32, hereafter referred to as a calibrating coil, will create a magnetic field which varies the total magnetic induction to which the Hall generator is exposed. The calibrating coil has its terminals connected to an amplitude stabilizer 34 and a calibrating signal generator 36.

The signal generator 36 generates an alternating current calibrating signal $f_k$ whose amplitude is stabilized by the amplitude stabilizer 34 and creates an alternating magnetic field through the Hall generator at a frequency which is preferably outside the band of frequencies of variation of magnetic induction which the Hall generator is intended to investigate. In this embodiment the particular frequency of $f_k$ is preferably higher than the useful span of measurement of the instrument because of convenience in circuit design and to insure optimum rate of compensation and should be at least ten times the maximum signal variation frequency to be instrumented. The importance of having $f_k$ lie above the maximum signal frequency lies in the fact that when $f_k$ is at a higher frequency it allows the rate of compensation of the Hall effect sensitivity coefficient to occur at a rate rapid enough to accommodate the dynamic characteristic of the signal frequency itself. Since the envelope amplitude recovered from the calibrating frequency $f_k$ must be demodulated in this embodiment, it is desirable that the $f_k$ frequency be at least ten times the maximum signal variation frequency to be measured.

The Hall voltage output $E_h$ which appears on the lines 26 as a result of the magnetic field to be transduced and the magnetic field created by the calibrating coil is fed to a low pass filter 38 having a cut-off frequency higher than the highest frequency of variation of the magnetic induction to be transduced but lower than the frequency of induction created by the calibrating coil 32 and signal generator 36. The output from the low pass filter 38 is fed to suitable signal analyzer circuit 40 of any conventional or desired type.

The Hall voltage $E_h$ appearing on lines 26 is also fed to a band pass filter 42 having a pass band which passes the voltage components at the frequency of the signal generator 36. This signal is then fed to a rectifier 44 and load resistor 46 which is shunted by a capacitor 48. The other side of the resistor 46 is grounded as shown at 50.

It will be apparent that the magnetic field created by the calibrating coil 32 causes an alternating current signal component in the Hall voltage signal $E_h$ and that this alternating current component passes through the band pass filter 42. This alternating current signal is rectified by the rectifier 44 and appears across the load resistor 46 as a direct current voltage $E_k$. A reference voltage $E_{std}$ produced by a cell 52 is opposed to the voltage across the resistor 46 by having one terminal thereof connected to ground at 50 and the other terminal connected to a chopper 54. The lower terminal of the load resistor 46 is also connected to the chopper 54 so that the input to the chopper constitutes the difference between the reference voltage $E_{std}$ and the voltage appearing across the resistor 56.

The chopper 54 controls a servo motor 56 in a conventional manner. That is to say, the shaft 58 of the servo motor 56 remains stationary so long as the voltage across the resistor 46 is equal and opposite to the reference voltage 52. If the voltage across the resistor 46 exceeds or is less than the reference voltage the shaft of the servo motor is caused to move in a direction controlled by the relative difference between these two voltages. The servo motor shaft 58 is connected by a suitable linkage 60 to control the position of the variable tap on the variable resistor 20 to control the amplitude of the exciting current $I_c$ fed to the Hall generator.

In the operation of a Hall generator in the transduction of a magnetic field, it is desirable to create a constant relationship between a change in the magnetic field to be transduced and the output voltage of the Hall generator. The device of FIGURE 1 operates to achieve this result in the following fashion. The signal generator 36 and amplitude stabilizer 34 create an alternating current signal of constant amplitude and frequency of a predetermined value and this is fed to the calibrating coil 32. The resulting magnetic field causes the generation of a Hall calibrating signal $f_k$ which passes through the band pass filter 42 and is fed to the rectifier 44 to provide a D.C. calibrating voltage $E_k$ across the load resistor 46. This voltage $E_k$ as compared to a reference voltage $E_{std}$ and when the two voltages are equal it is known that the measurable field variation produced by the calibrating coil 32 creates the measurable signal $f_k$. The generator is thereby calibrated.

If the environmental conditions of the generator, such as, for example, the temperature, now change, and the voltage $E_k$ produced across the resistor 46 changes, an error signal is fed to the chopper 54 thereby causing the servo motor 56 to be actuated and change the value of the exciting current $I_c$ fed to the Hall generator over the lead 16. This variation in exciting current is in such a direction as to again bring the voltage across the resistor 56 into registry with the reference voltage so that the relationship between the magnetic field produced by the calibrating coil 32 and the resulting signal $f_k$ is again at the calibrated value. In this manner the conversion efficiency of the Hall generator is continuously maintained at a predetermined value.

Figure 2:
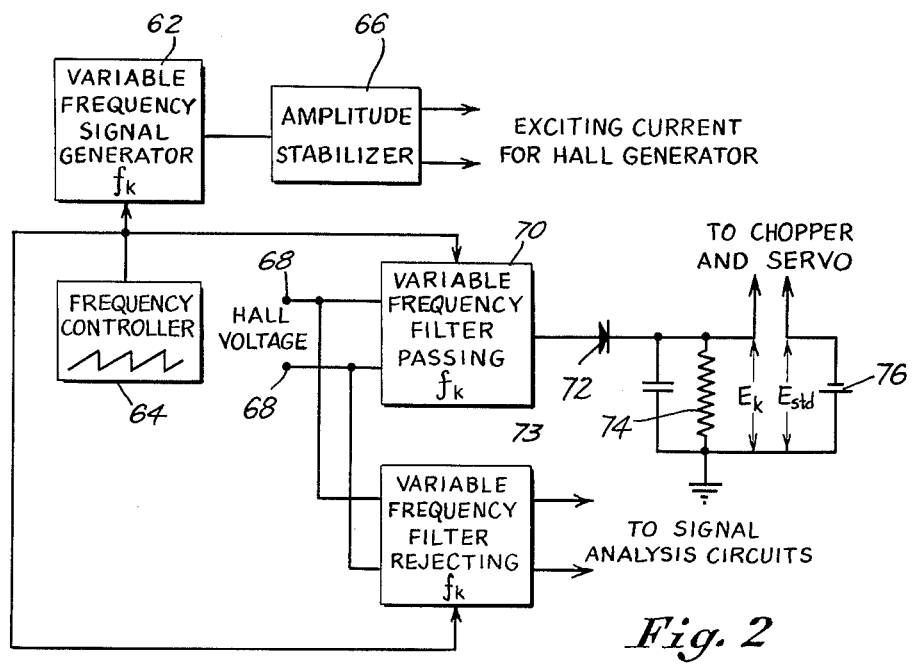
FIGURE 2 is a diagrammatic illustration of a Hall generator transducer constructed according to another embodiment of the invention.
Figure 3:
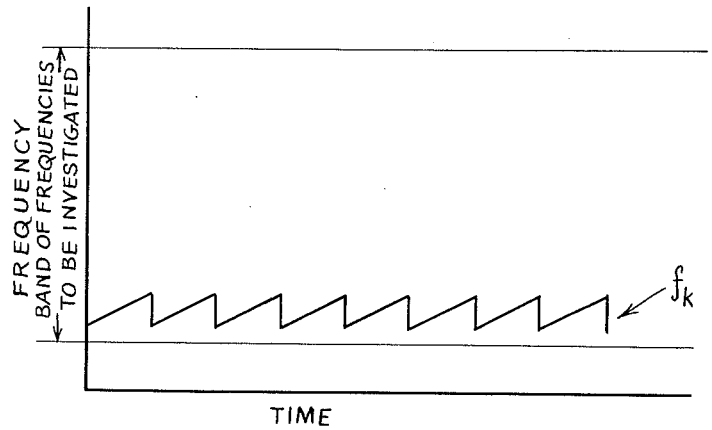
FIGURE 3 is a graphical depiction of the relationship of the frequency of the standardization generator to the range of frequencies under investigation according to the embodiment of the invention illustrated in FIGURE 2.

In the embodiment of the invention just described it has been stated that the frequency of the calibrating signal $f_k$ was chosen to lie outside of the band of frequencies of variation of magnetic induction which the Hall generator is intended to investigate. Should it be necessary to have the calibrating frequency $f_k$ lie within the pass band of signal frequencies a frequency shift technique may be used to separate $f_k$ from $f_s$ and FIGURES 2 and 3 illustrate such an arrangement. Referring to FIGURE 2 the calibrating signal generator 62 which generates $f_k$ is a frequency generator capable of generating a signal $f_k$ at variable frequencies. The frequency of signal generated by the signal generator 62 is controlled by a frequency controller 64 which, in the illustrated example, causes the frequency of the signal generator 62 to vary in saw tooth fashion as illustrated at $f_k$ in FIGURE 3. This signal is fed to an amplitude stabilizer 66 which provides the exciting current $I_c$ for the Hall generator.

The Hall voltage $E_k$ appears at the terminals 68 in FIGURE 2 and is fed to a pair of variable frequency filters 70 and 73. The filter 70 is a variable pass band filter adapted to pass the calibrating signal $f_k$. The frequency of this variable frequency filter is controlled by the frequency controller 64 which feeds a control signal thereinto. The output of the filter 70 in turn is fed to a rectifier 72 to produce a direct current voltage $E_k$ across the load resistor 74 as in the preceding embodiment of the invention. This voltage is compared to the reference voltage $E_{std}$ produced by a cell 76 and the difference fed to a chopper and servo motor also as in the preceding embodiment.

The Hall voltage is also fed to a reject filter 73 adapted to pass everything except the calibrating signal $f_k$. The tuning or setting of the reject band of this filter is also controlled by the frequency controller 64 and the output of the filter is fed to the signal analyzer circuit.

The operation of this embodiment of the invention is generally similar to that described in connection with FIGURE 1 except that the frequency of the calibrating magnetic field lies within the band of frequencies of variation of magnetic induction which the Hall generator is intended to investigate. The frequency of this calibrating magnetic field, however, is swept through a limited range of frequencies and is rejected from the signal analyzer circuits by the variable frequency filter 73. The rejection does not provide a blank spot in the sensing capabilities of the transducer since the rejection frequency is constantly changing and does not occur at one frequency for a long enough period of time to substantially effect the results produced by the device.

In addition to the use of a frequency shift technique in order to operate with the calibrating signal within the band of frequencies of variation of magnetic induction which the Hall generator is intended to investigate, it is also possible to use a time shared method. In a method of this type the signal analyzer circuit is blanked or disabled during a short period of time during which a burst of energy at the calibrating frequency $f_k$ is introduced into the calibraing coil. The necessary comparsion of level between the voltages $E_k$ and $E_{std}$ is then carried out and the necessary adjustments performed to the value of the exciting current $I_c$. It is practicable to make the time constant of the circuit or devices adjusting the exiciting current $I_c$ fairly long so that the circuit is responsive to the average of the data obtained from a multiplicity of the sampling periods. One such arrangement is shown in FIGURE 4.

Figure 4:
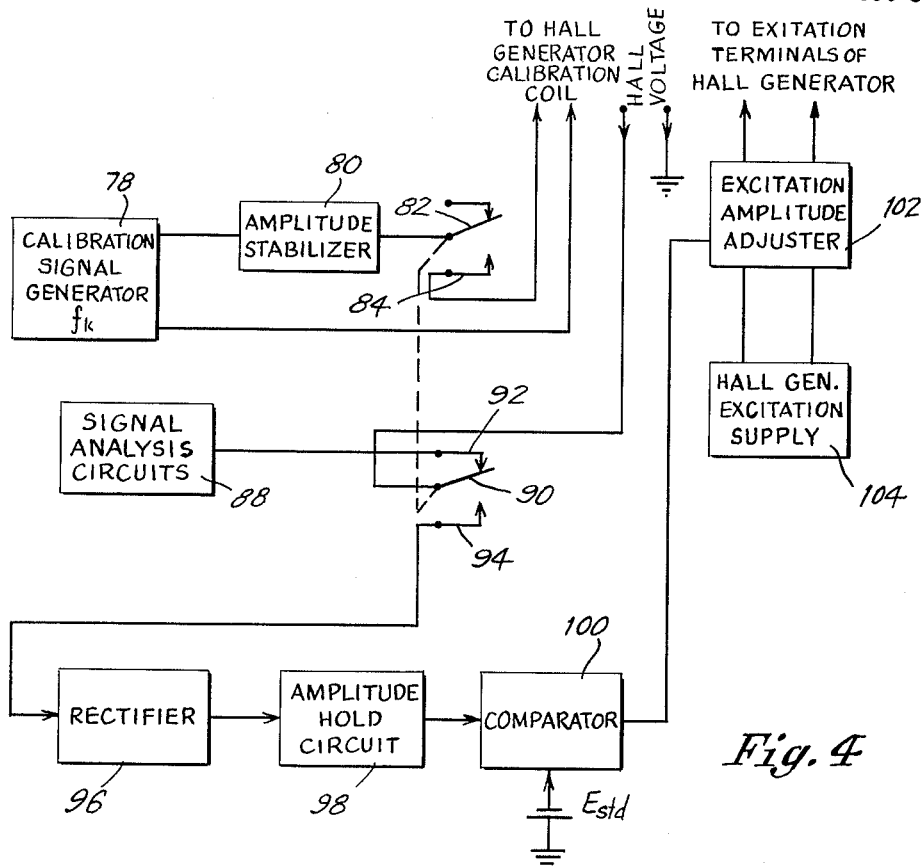
FIGURE 4 is a diagrammatic illustration of a Hall generator transducer constructed according to still another embodiment of the invention.

According to the embodiment shown in FIGURE 4, the calibration signal generator 78 and amplitude stabilizer 80 feed a signal to the Hall generator calibration coil through normally open switch contacts 82 and 84. The Hall voltage output of the Hall generator appears at the terminals 86 and is fed to the signal analyzer circuit 88 through a single pole double throw set of contacts 90, 92 and 94. The contact 94 is connected to a rectifier 96 which feeds a direct current signal $E_k$ to an amplitude hold circuit 98 and then to a comparator 100. The comparator 100 compares the direct current voltage $E_k$ with a reference voltage $E_{std}$ as in the previous embodiments and feeds an error signal to the excitation amplitude adjuster 102. This excitation amplitude adjuster receives an excitation supply from the Hall generator excitation supply 104 and feeds an output to the excitation terminals of the Hall generator as in previous embodiments of the invention.

The movable contacts 82 and 90 are ganged and are actuated by a coil which is not shown but which is arranged to periodically close contacts 82–84 and 90–94 for a predetermined period of time. This actuating means may be any suitable device such as a multi-vibrator of other equivalent means which will be obvious to those skilled in the art.

Figure 5:
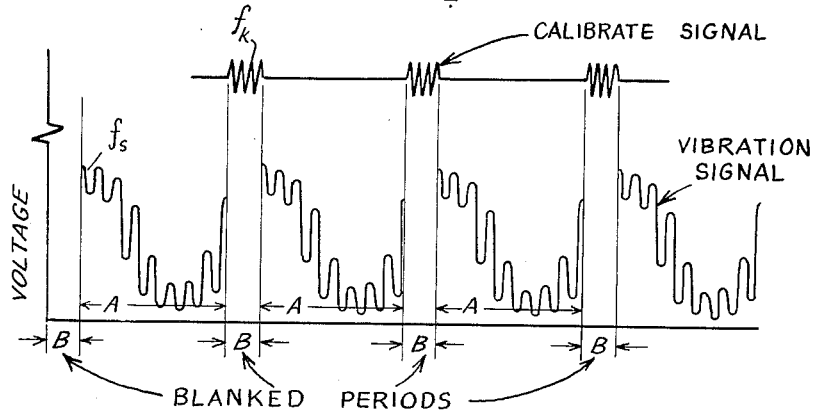
FIGURE 5 is a graphical depiction of the output signal of the Hall generator transducer according to the embodiment of the invention illustrated in FIGURE 4.

In the operation of the embodiment of the invention illustrated in FIGURES 4 and 5 the calibration signal generator 78 develops a signal $f_k$ which is fed through the amplitude stabilizer 80 to the Hall generator calibration coil only when the contacts 82 and 84 are closed. When these contacts are closed and the contacts 90 and 94 are closed the Hall voltage $E_h$ is fed to the rectifier 96, amplitude hold circuit 98 and comparator 100 to feed an eror signal to the excitation amplitude adjuster in order to adjust the excitation current of the Hall generator to insure a constant efficiency as in previously described embodiments of the invention. In the embodiment shown in FIGURE 4, however, the Hall voltage $E_h$ is fed to the excitation control circuit only during the time that the contacts 90 and 94 are closed. During the times when the contacts 90 and 94 are open the Hall voltage $E_h$ is fed direct to the signal analyzer circuit 88 and the calibration coil on the Hall generator is unenergized.

Those periods of time during which the Hall voltage $E_h$ consists of a signal $f_s$ are indicated at A in FIGURE 5. These intervals during which the signal voltage is fed to the signal analyzing circuits are alternated with blank periods of time illustrated at B in FIGURE 5 during which the calibrating signal $f_k$ is fed to the calibrating coil on the Hall generator. The calibrating signal thus is fed to the rectifier 96 in FIGURE 4 in short bursts and the amplitude hold circuit 98 is utilized to maintain the D.C. voltage level between bursts. This D.C. voltage level is compared in the comparator 100 as in preceding embodiments of the invention. The ratio of times A and B may obviously be adjusted to insure that enough of the signal $f_s$ is transmitted to the analyzer circuits to permit accurate analysis. The ratio illustrated in FIGURE 5 is intended to be illustrative and not quantitative.

Figure 6:
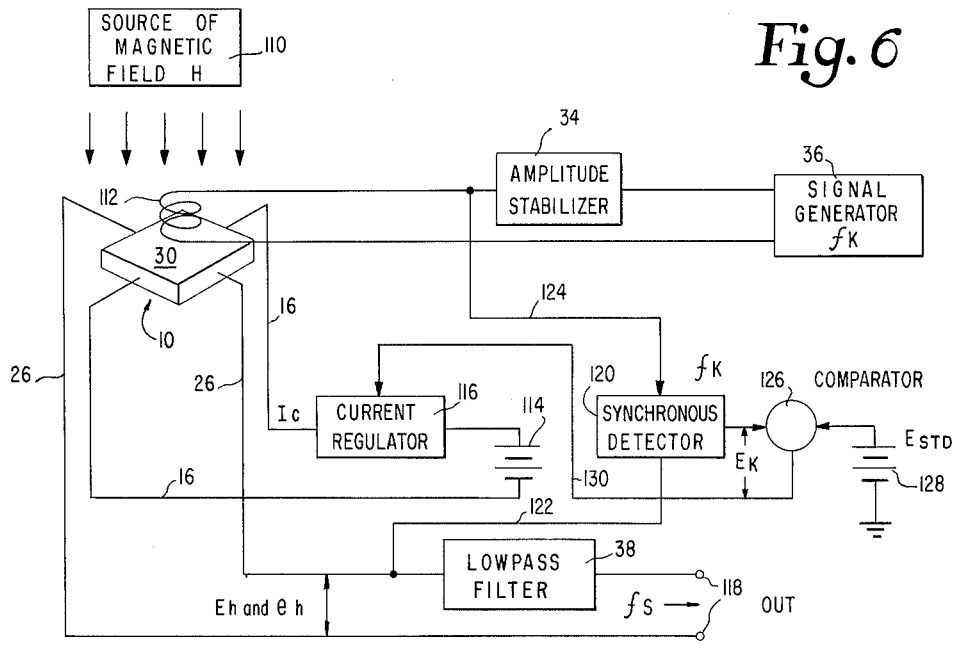
FIGURE 6 is a block diagram of a still further modified embodiment of the present invention.

FIGURE 6 shows a further modified embodiment of the Hall generator of the present invention similar to the embodiment of FIGURE 1 with like parts bearing like reference numerals. In this embodiment, the source of magnetic field H indicated at 110 applies a magnetic field to be instrumented to the Hall generator 10 in the manner of the previous embodiments. Signal generator 36 supplies a signal frequency $f_k$ through amplitude stabilizer 34 to a field producing coil 112. Coil 112 may be wrapped around the transducer 10 in the manner of coil 32 of FIGURE 1, or, as shown in FIGURE 6, may be positioned closely adjacent the transducer to subject the transducer to a magnetic field having a component perpendicular to the face 30 of the Hall generator.

A D.C. current source illustrated by the battery 114 supplies a control current $I_c$ to the Hall generator through a current regulator 116. The output voltage appearing on terminals 26 consisting of a low frequency or D.C. component $E_h$ and an A.C. component $e_h$ passes through a low pass filter 38 where the A.C. component is filtered out and only the low frequency or D.C. component $E_h$ appears as the signal $f_s$ at the output terminals 118.

The embodiment of FIGURE 6 differs from the embodiment of FIGURE 1, principally in that separation of the calibrating frequency signal from the signal to be measured is effected by means of a synchronous detector indicated at 120. This detector may be of the conventional type and receives the output from the transducer leads 26 by way of line 122 and is provided with a synchronizing signal of frequency $f_k$ by way of line 124 connected to the output of amplitude stabilizer 34. The synchronous detector produces an output signal $E_k$ in a well known manner which is a D.C. signal representative of the calibrating signal output of the Hall generator and this signal $E_k$ is applied to one input terminal of a comparator 126. The other input of the comparator is connected to a standard voltage source indicated by the battery 128 corresponding to the standard source 52 of FIGURE 1. The output of comparator 126 when an unbalance exists is supplied by way of lead 130 to the current regulator 126 in such a manner as to cause the current regulator to change the current $I_c$ in a direction to produce a balance between the signals $E_k$ and $E_{std}$ supplied to the two inputs of the comparator 126.

Figure 7A:
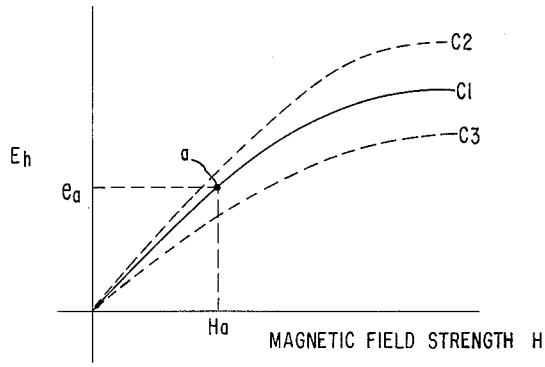
FIGURE 7a shows typical transfer characteristics of a Hall generator.

FIGURE 7a is a plot of transducer output voltage $E_h$ as a function of magnetic field strength H of the field to be instrumented and shows three transfer functions labelled $C_1$, $C_2$ and $C_3$ representing typical non-linear Hall effect responses of a Hall generator. A typical operating point is indicated at $a$ on the curve $C_1$ where a field strength $H_a$ produces an output voltage $e_a$. While temperature and gain compensation can be applied to return deviations toward curves $C_2$ and $C_3$ to an original calibration based on $C_1$ the non-linearity of curve $C_1$ still remains over significant portions of the curve.

Figure 7B:
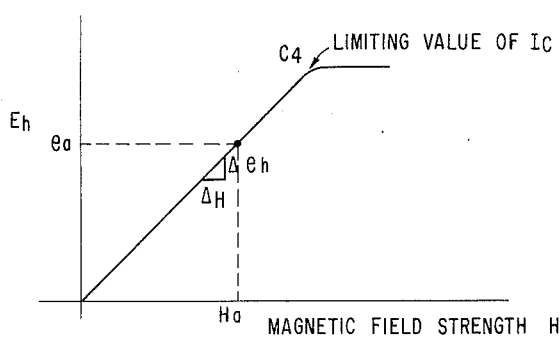
FIGURE 7b shows the improved linearity of the transfer characteristic of the Hall generator of the present invention.

FIGURE 7b is a similar plot of output voltage $E_h$ as a function of magnetic field strength H for a Hall generator constructed in accordance with the present invention and shows the improved linearity of the transfer characteristic illustrated by the curve labelled $C_4$. In the present invention by applying a calibration "carrier" of variational magnetic field $f_k$ and of constant $\Delta h$ value, standardization by adjusting the value of $I_c$ causes a linearization of the curve $C_4$ in addition to holding the slope at $H_a$ such that the Hall voltage $E_a$ results. As illustrated by the flattening off of the curve $C_4$ at its upper end, the limit value occurs when the allowable limit of $I_c$ is reached.

It will be apparent from the foregoing that according to the present invention it is possible to provide a Hall generator having a fixed and predetermined conversion efficiency despite variations in environmental conditions which would otherwise modify its operating characteristics. As a result, a transducer formed of such a generator is provided with an accuracy relatively independent of ambient temperature and of ageing or other changes in the Hall generator itself.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A transducer comprising a Hall generator adapted to transduce a magnetic field to an electric signal, a source of excitation current connected to said generator, means to vary said excitation current, coil means associated with said Hall generator, said coil means being so disposed that on energization said coil means creates a magnetic field which varies the said magnetic field to be transduced, means for energizing said coil to create a calibrating signal output of said Hall generator, rectifying means connected to rectify said calibrating signal, a reference voltage source, comparator means for comparing said rectified calibrating signal and said reference voltage and producing a difference signal, and means responsive to said difference signal associated with said means for varying said excitation current to vary said current in response to changes in said rectified calibrating signal to maintain the conversion efficiency of said transducer substantially constant.

2. A transducer comprising a Hall generator adapted to transduce a varying magnetic field to an alternating current electric signal, a source of excitation current connected to said Hall generator, means to vary said excitation current, coil means associated with said Hall generator, said coil means being so disposed that on energization said coil means creates a magnetic field which varies the said magnetic field to be transduced, means for energizing said coil with an alternating current to create a calibrating signal, filter means connected to said Hall generator for segregating said calibrating signal from other signal outputs from said generator, means responsive to said segregated calibrating signal associated with said means for varying said excitation current to vary said current in response to changes in said calibrating signal to maintain the conversion efficiency of said transducer substantially constant.

3. A transducer comprising a Hall generator adapted to transduce a varying magnetic field to an alternating current electric signal, a source of excitation current connected to said Hall generator, means to vary said excitation current, coil means associated with said Hall generator, said coil means being so disposed that on energization said coil means creates a magnetic field which varies the said magnetic field to be transduced, means for energizing said coil with an alternating current to create a calibrating signal, filter means connected to said Hall generator for segregating said calibrating signal from other signal outputs from said generator, rectifying means connected to rectify said segregated calibrating signal, a reference voltage source, comparator means for comparing said rectified calibrating signal and said reference voltage and producing a difference signal, and means responsive to said difference signal associated with said means for varying said excitation current to vary said current in response to changes in said rectified calibrating signal to maintain the conversion efficiency of said transducer substantially constant.

4. A transducer as set out in claim 2 wherein said transducer is designed to transduce varying magnetic fields within a predetermined band of frequencies, and the frequency of said coil energizing signal is higher than the highest frequency in said band.

5. A transducer as set out in claim 2 wherein said means for energizing said coil comprises a signal generator capable of generating signals at various frequencies, means for cyclically varying the frequency of the signal produced by said signal generator, said filter means being of a pass band type wherein the frequency of the pass band may be varied, said means for varying the frequency of said signal generator being connected to vary the frequency of said filter so that said filter passes a signal of the frequency being produced by the signal generator.

6. A transducer comprising a Hall generator adapted to transduce a varying magnetic field to an alternating current electric signal, a source of excitation current connected to said Hall generator, means to vary said excitation current, coil means associated with said Hall generator, said coil means being so disposed that on energization said coil means creates a magnetic field which varies the said magnetic field to be transduced, means for energizing said coil with an alternating current to create a calibrating signal, filter means connected to said Hall generator for segregating said calibrating signal from other signal outputs from said generator, means for connecting said energizing means to said coil, means responsive to said calibrating signal associated with said means for varying said excitation current to vary said current in response to changes in said calibrating signal to maintain the conversion efficiency of said transducer substantially constant, output terminals for said transducer, means for connecting the output of said Hall generator to said output terminals, and means for intermittently connecting said coil energizing means to said coil and intermittently connecting the output of said Hall generator to said output terminals, said output of said Hall generator being disconnected from said output terminals when said energizing means is connected to said coil.

7. A transducer comprising a Hall generator adapted to transduce a first magnetic field to a first electric signal, a source of excitation current connected to said generator, means for varying said excitation current, magnetic field producing means for subjecting said generator to a second magnetic field to produce a calibrating signal, means coupled to said generator for distinguishing between said signals, and means responsive to only said calibrating signal and coupled to said means for varying said excitation current to vary said current in response to changes in said calibrating signal to maintain the conversion efficiency of said transducer substantially constant.

8. A transducer as set out in claim 7 wherein said magnetic field producing means comprises a coil.

9. A transducer according to claim 8 wherein said coil is energized at a frequency at least ten times the frequency of the highest frequency variation of said first magnetic field.

10. A transducer comprising a Hall generator, a variable source for passing a variable excitation current through said generator, means for applying first and second magnetic fields to said generator to produce first and second electrical outputs from said generator corresponding to said magnetic fields, means for distinguishing between said outputs, and means for varying said source in accordance with only one of said outputs to maintain the conversion efficiency of said transducer substantially constant.

11. A transducer as set out in claim 10 wherein said one output is produced by a coil continuously energized at a fixed frequency.

12. A transducer as set out in claim 10 wherein said one output is produced by an intermittently energized coil.

13. A transducer as set out in claim 10 wherein said one output is produced by a coil energized at a cyclically varying frequency.

14. A Hall transducer having a substantially linear conversion characteristic comprising a Hall generator adapted to transduce a first low frequency magnetic field to a low frequency electric signal, a variable source for passing a variable excitation current through said generator, means for applying a second high frequency magnetic field to said generator to produce a high frequency calibrating signal from said generator, frequency sensitive means for distinguishing between said signals, and means for varying said source in accordance with only said high frequency signal to maintain the conversion efficiency of said transducer substantially constant.

15. A transducer as set out in claim 14 wherein said frequency sensitive means includes a synchronous detector.

References Cited by the Examiner

UNITED STATES PATENTS

| | | | |
|---|---|---|---|
| 2,464,807 | 3/1949 | Hansen | 321—45 |
| 2,551,265 | 5/1951 | Hansen | 323—94 X |
| 2,852,732 | 9/1958 | Weiss | 323—94 |

LLOYD McCOLLUM, *Primary Examiner.*